(12) United States Patent  (10) Patent No.: US 8,960,770 B2
De Luca  (45) Date of Patent: Feb. 24, 2015

(54) REAR SPOILER WITH ADJUSTABLE AERODYNAMIC PROFILES FOR A HIGH PERFORMANCE ROAD VEHICLE

(71) Applicant: Ferrari S.p.A., Modena (IT)

(72) Inventor: Marco De Luca, Modena (IT)

(73) Assignee: Ferrari S.p.A. (IT)

( * ) Notice: Subject to any disclaimer, the term of this patent is extended or adjusted under 35 U.S.C. 154(b) by 55 days.

(21) Appl. No.: 13/774,079

(22) Filed: Feb. 22, 2013

(65) Prior Publication Data

US 2013/0221701 A1  Aug. 29, 2013

(30) Foreign Application Priority Data

Feb. 24, 2012 (IT) .............................. BO2012A0088

(51) Int. Cl.
*B62D 35/00* (2006.01)
*B62D 37/02* (2006.01)
(52) U.S. Cl.
CPC .............. *B62D 35/007* (2013.01); *B62D 37/02* (2013.01)
USPC ...................................................... 296/180.5
(58) Field of Classification Search
CPC .............................. B62D 35/007; B62D 35/00
USPC ........................... 296/180.1, 180.4, 180.5, 76
See application file for complete search history.

(56) References Cited

U.S. PATENT DOCUMENTS 3,596,974 A * 8/1971 Adams ........................ 296/180.2
4,432,516 A * 2/1984 Muscatell ..................... 244/219
4,671,555 A * 6/1987 Linz et al. .................. 296/180.5
5,013,081 A * 5/1991 Cronce et al. .............. 296/180.1
5,678,884 A * 10/1997 Murkett et al. ............. 296/180.1
7,517,004 B2 * 4/2009 Honeycutt .................. 296/180.1
7,607,718 B2 * 10/2009 Schwan et al. ............. 296/180.5
7,708,335 B2 * 5/2010 Wegener .................... 296/180.5
7,770,962 B1 * 8/2010 Maxwell .................... 296/180.5
8,113,571 B2 * 2/2012 Goenueldinc .............. 296/180.5
2001/0052717 A1 * 12/2001 Yoon ......................... 296/180.1

FOREIGN PATENT DOCUMENTS

DE    102004049042 A1   4/2006
EP        1659050 A2    5/2006
FR        2657060 A1    7/1991
FR        2673591 A1    9/1992

OTHER PUBLICATIONS

"Italian Application Serial No. IT BO20120088, Search Report dated Sep. 21, 2012", 7 pgs.

* cited by examiner

*Primary Examiner* — Pinel Romain
(74) *Attorney, Agent, or Firm* — Schwegman Lundberg & Woessner, P.A.

(57) ABSTRACT

A rear spoiler with adjustable aerodynamic profiles for a high performance road vehicle, the rear spoiler including: at least one fin-shaped support, a first adjustable aerodynamic profile that is mounted onto the fin-shaped support and that rotates around a first rotational axis, and a second adjustable aerodynamic profile that is mounted onto the fin-shaped support at a different height than the first aerodynamic profile and that rotates around a second rotational axis, that is parallel to the first rotational axis, and in an opposite direction with respect to the rotation of the first aerodynamic profile, wherein the first rotational axis is located close to a trailing edge of the first aerodynamic profile and the second rotational axis is located close to a leading edge of the second aerodynamic profile.

26 Claims, 8 Drawing Sheets

REAR SPOILER WITH ADJUSTABLE AERODYNAMIC PROFILES FOR A HIGH PERFORMANCE ROAD VEHICLE

PRIORITY CLAIM AND RELATED APPLICATIONS

This application claims the benefit of priority under 35 U.S.C. Section 119 to Italian Patent Application Serial No. BO2012A 000088, filed on Feb. 24, 2012, which application is incorporated herein by reference in its entirety.

FIELD OF THE INVENTION

The present invention relates to a rear spoiler with adjustable aerodynamic profiles for a high performance road vehicle.

BACKGROUND

From the aerodynamic point of view, the external shape of the body of a high performance road vehicle is designed to achieve two objectives (which are often in contrast with each other): minimizing (both by reducing the overall front section and by reducing the aerodynamic penetration coefficient) the running resistance (i.e. minimizing the aerodynamic load component aligned with and opposite to the motion direction) and maximizing the downforce (i.e. maximizing the downward vertical aerodynamic load component).

In order to increase the downforce, the custom of using specific aerodynamic projecting elements is known, which projecting elements are mounted onto the road vehicle body. One of the most common aerodynamic projecting elements is the rear spoiler which is arranged at the rear portion of the vehicle and serves the function of increasing the downforce (i.e. the downward vertical aerodynamic load) which mainly rests on the rear wheels (which are driving wheels in almost all the high performance road vehicles). The rear spoiler may comprise a single centrally arranged fin-shaped support or a pair of laterally arranged fin-shaped supports (a typical solution in free-circulation or commercially available road vehicles) which support at least one horizontally arranged aerodynamic profile or airfoil and which, being impinged by the air, generate the desired lift. The rear spoiler may comprise a single aerodynamic profile (in this case it is referred to as a single-winged rear spoiler) or two, three or more vertically overlapping aerodynamic profiles (in this case it is referred to as a multi-winged rear spoiler).

A particular multi-winged configuration (generally with two or at most three aerodynamic profiles) includes a primary aerodynamic profile (referred to as "main") which is aerodynamically assisted by other ancillary aerodynamic profiles (referred to as "flaps"), the leading edges of which are located close to the trailing edge of the main aerodynamic profile to be assisted, and in a sequence, to the trailing edges of the following profiles.

If on the one hand the provision of a rear spoiler increases the downforce (positive effect), on the other hand the provision of a rear spoiler also increases the running resistance (which is a normally negative effect, but when braking), and thus the rear spoiler design should always be a compromise between these two diametrically opposite aspects in order to maximize the road vehicle performance.

In on-track driving, a rear spoiler with a high aerodynamic load is an advantage (due to the positive effect of the downforce) at average speeds (i.e. of the order of 180-240 Km/h; 112-150 mph), at which the road vehicle is strongly accelerated/decelerated and/or is driven on a bend or curve (and therefore the road vehicle wheels must transmit a very high longitudinal force and/or transversal force to the ground); on the other hand, a rear spoiler with a high aerodynamic load is a drawback (due to the negative effect of the running resistance) at high speeds (higher than 280-300 Km/h; 174-186 mph), at which the road vehicle performance is directly linked to the minimization of all the running resistance components. Accordingly, a rear spoiler has been proposed which is provided with at least one adjustable aerodynamic profile mounted to be adjusted between a maximum incidence position, for generating the maximum downforce (and thus also the maximum running resistance), which is generally used at average speeds and when braking, and a minimum incidence position for obtaining the minimum downforce (and thus also the minimum running resistance) which is generally used at high speeds.

However, the currently known rear spoilers provided with adjustable aerodynamic profiles have some drawbacks as they are not able to achieve a high aerodynamic efficiency (i.e. maximize the ratio of the downforce obtainable with the "all-closed" aerodynamic profiles to the running resistance obtainable with the "all-open" aerodynamic profiles) and/or require a complex, heavy and cumbersome actuation system.

SUMMARY

The present subject matter provides a rear spoiler with adjustable aerodynamic profiles for a high performance road vehicle, which rear spoiler is free from the above-described drawbacks while being easy and cost-effective to be implemented.

According to the present subject matter, a rear spoiler with adjustable aerodynamic profiles for a high performance road vehicle is provided as claimed in the appended claims.

BRIEF DESCRIPTION OF THE DRAWINGS

The present invention will now be described with reference to the accompanying drawings, which illustrate a non-limiting example thereof, in which.

DETAILED DESCRIPTION

Figure 1:
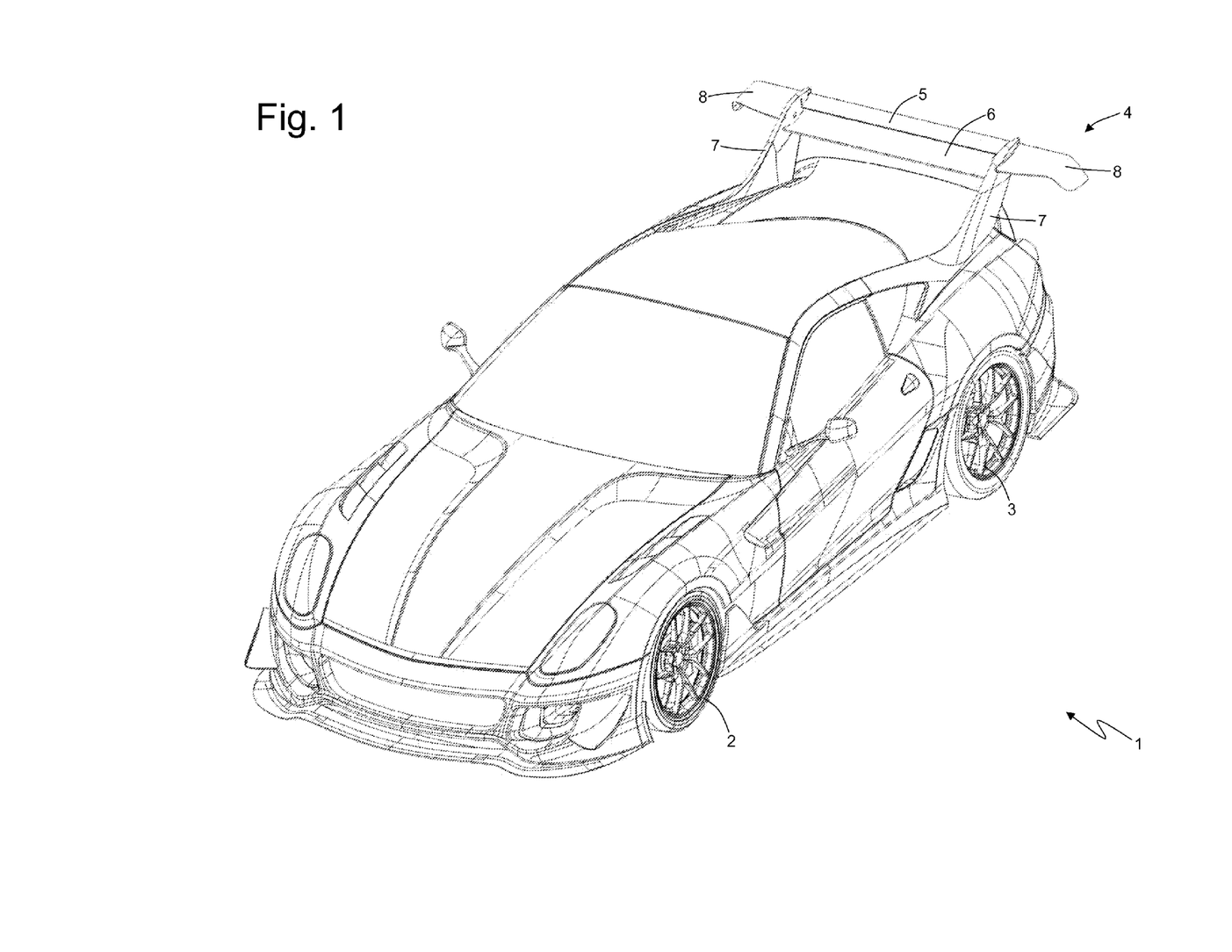
FIG. 1 shows a diagrammatic perspective view of a road vehicle provided with a rear spoiler with adjustable aerodynamic profiles implemented according to the present subject matter.
Figure 2:
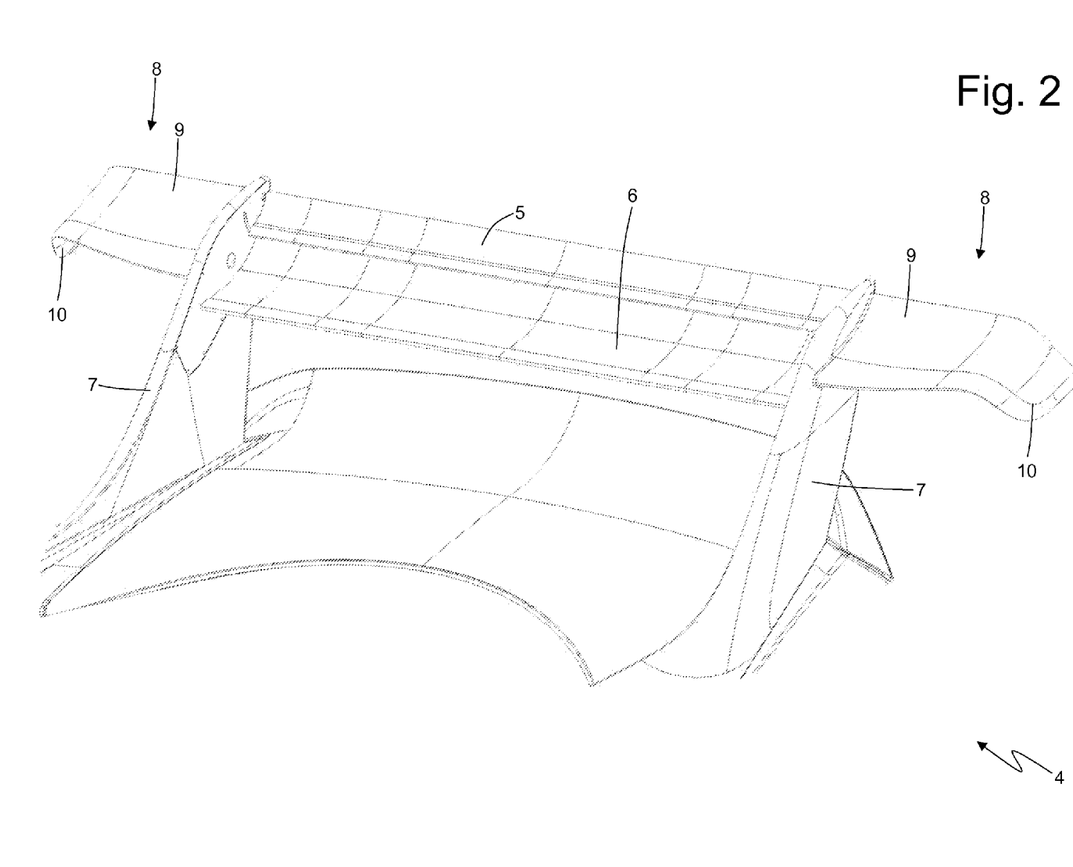
FIGS. 2 and 3 show two diagrammatic, perspective views, on enlarged scale, of the rear spoiler in FIG. 1, in a maximum incidence configuration and in a minimum incidence configuration, respectively.
Figure 3:
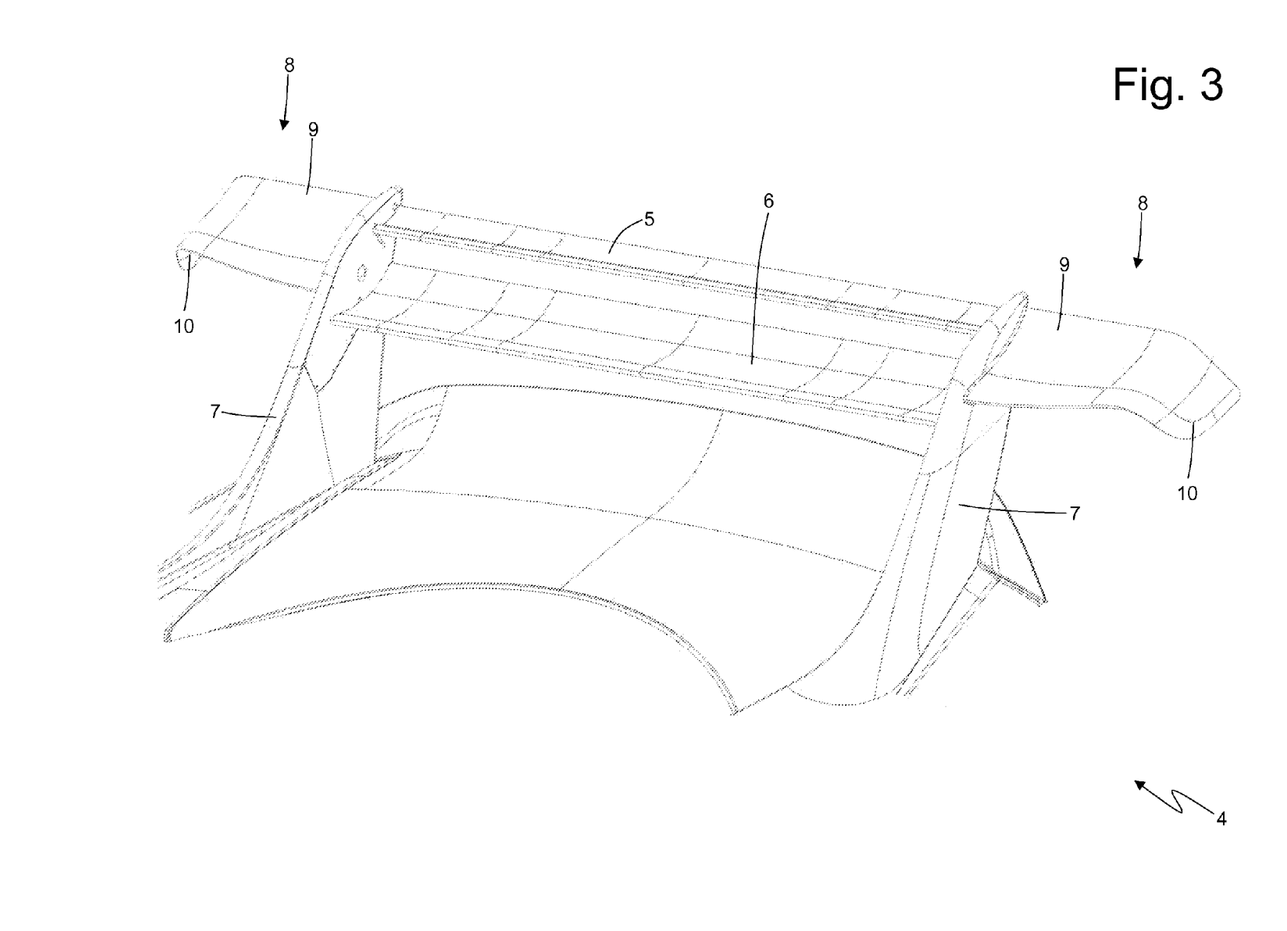
Figure 4:
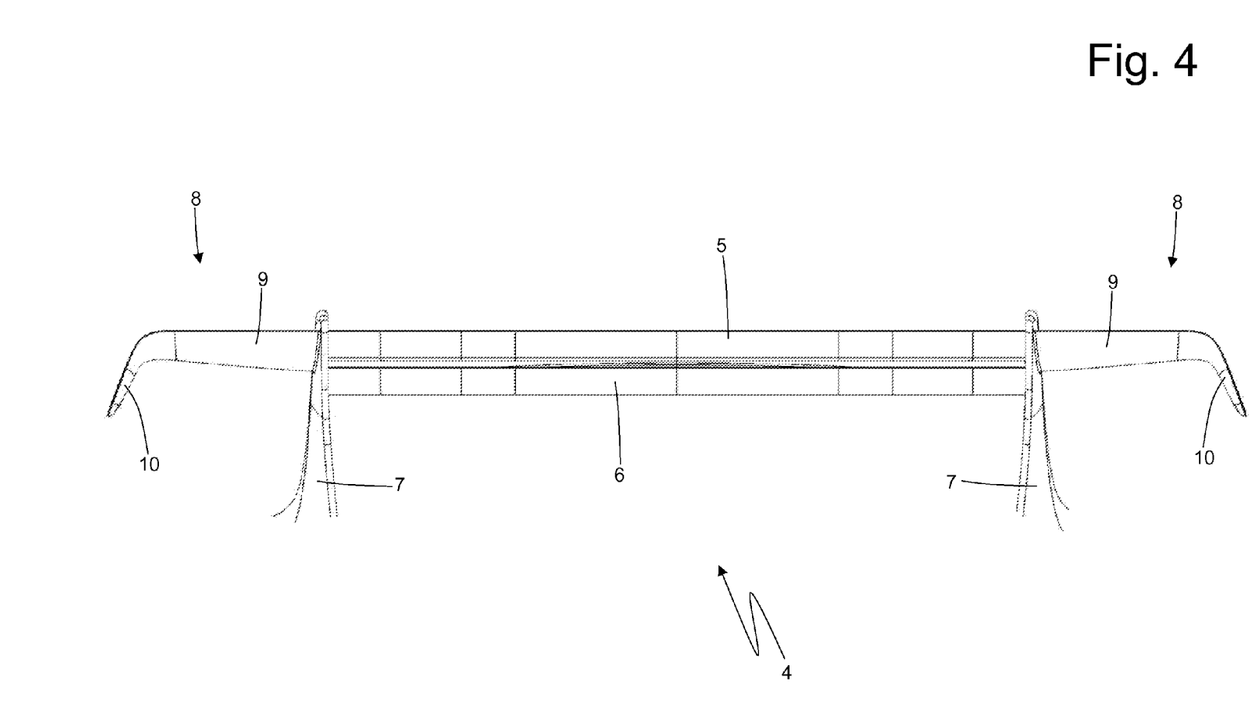
FIGS. 4 and 5 show two diagrammatic views, a rear view and a side view, respectively, and with parts removed for clarity, of the rear spoiler in FIG. 1.
Figure 5:
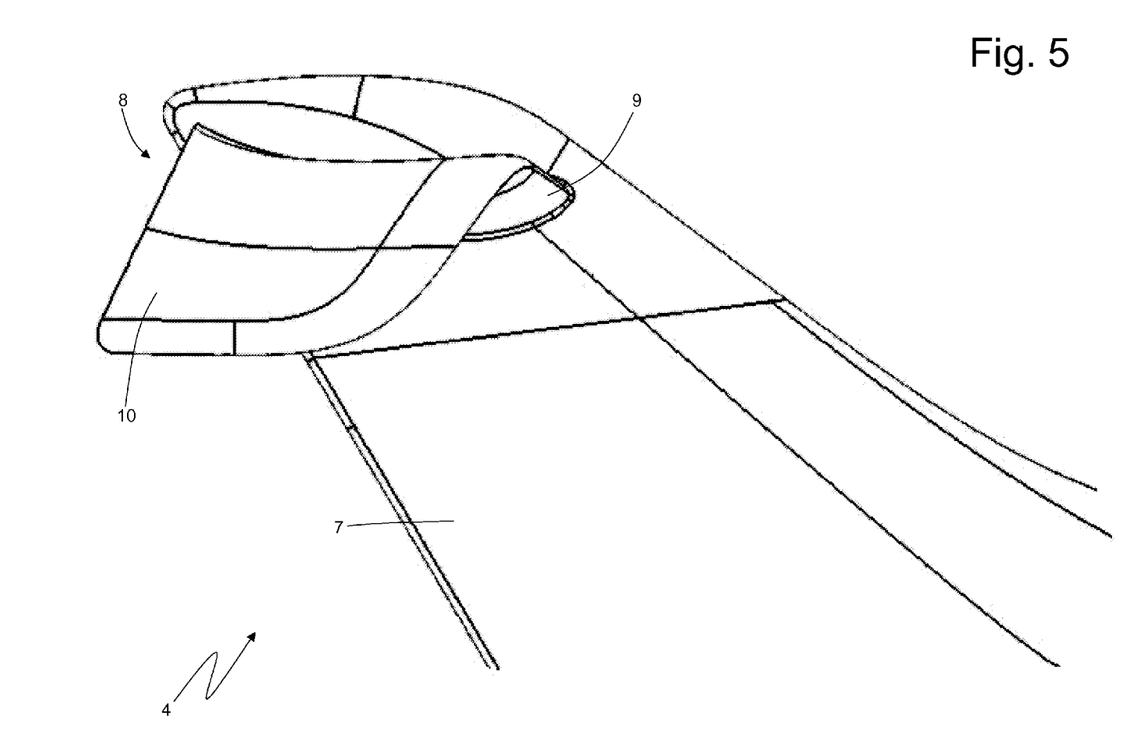

In FIG. 1, reference numeral 1 indicates as a whole a high performance road vehicle, provided with two front wheels 2 and two driving rear wheels 3.

The road vehicle 1 is provided with a two-winged rear spoiler 4 which comprises an upper adjustable aerodynamic profile 5, a lower adjustable aerodynamic profile 6, and a pair of fin-shaped supports 7 which are vertically arranged at the opposite sides of the road vehicle 1 and support the aerodynamic profiles 5 and 6. In other words, the upper aerodynamic profile 5 is mounted onto the fin-shaped supports 7 at a different height and spaced apart from the lower aerodynamic profile 6 which is thus arranged underneath the upper aerodynamic profile 5. Each aerodynamic profile 5 and 6 has a cross section (seen in FIGS. 6 and 7) which is shaped according to the typical pattern technically known as "aerodynamic profile" and thus having the leading edge (i.e. the spoke end) arranged at the front with respect to the forward direction, and the trailing edge (i.e. the thinnest part) arranged at the back. The lower aerodynamic profile 6 is a primary aerodynamic profile (referred to as "main"), and in use, it is aerodynamically assisted by the upper aerodynamic profile 5 which is an ancillary aerodynamic profile (referred to as "flap"); to this end, the leading edge (arranged at the front) of the upper aerodynamic profile 5 is located close to the trailing edge (arranged at the back) of the lower aerodynamic profile 6 to be assisted. In other words, the leading edge (arranged at the front) of the upper aerodynamic profile 5 is located above the trailing edge (arranged at the back) of the lower aerodynamic profile 6 to be assisted. The upper aerodynamic profile 5 can be smaller than the lower aerodynamic profile 6.

Moreover, the upper aerodynamic profile 5 is arranged in a rearward position with respect to the lower aerodynamic profile 6, i.e. the tail of the upper aerodynamic profile 5 is not vertically aligned (as it is more rearward than the motion direction) with the tail of the lower aerodynamic profile 6.

According to an embodiment better shown in FIGS. 2-5, the rear spoiler 4 comprises two lateral projecting elements 8, each of which being fixed to the corresponding fin-shaped support 7 on the side opposite to the aerodynamic profiles 5 and 6; in other words, each fin-shaped support 7 has an internal face to which the aerodynamic profiles 5 and 6 are connected, and an external face opposite to the internal face to which the corresponding lateral projecting element 8 is connected. Each lateral projecting element 8 is L-shaped when viewed from the front and consists of a substantially horizontal innermost part 9 that is fixed to the external surface of the corresponding fin-shaped support 7, and of an outermost part 10 that is inclined with respect to the innermost part 9, so as to bend towards the vertical (such an inclination is also identifiable by the technical definition of "negative dihedral angle"); the outermost part 10 can form an angle between 45° and 90° with the innermost part 9.

Figure 6:
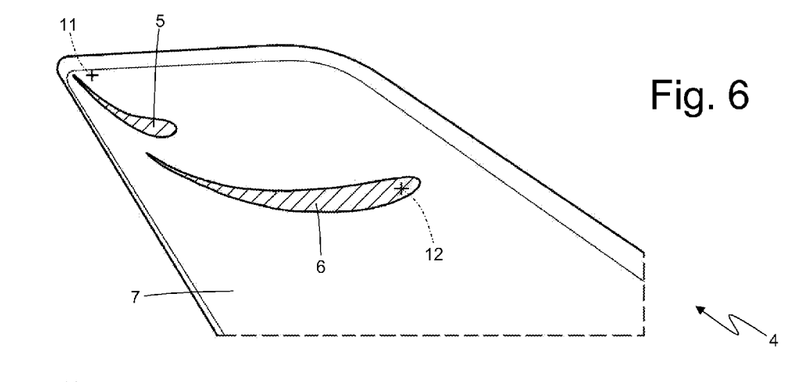
FIGS. 6 and 7 show two diagrammatic, longitudinal section views, with parts removed for clarity, of the rear spoiler in FIG. 1, in a maximum incidence configuration and in a minimum incidence configuration, respectively.
Figure 7:
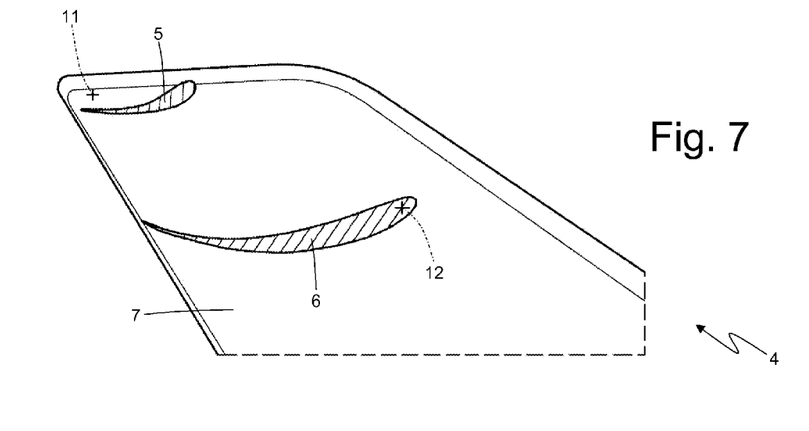

As shown in FIGS. 6 and 7, the upper aerodynamic profile 5 is mounted within the fin-shaped supports 7 to rotate around a horizontal rotational axis 11 which is transversally arranged with respect to the forward direction of the road vehicle 1 and passes close to the trailing edge (arranged at the back) of the upper aerodynamic profile 5; that is, the rotational axis 11 is arranged at the trailing edge of the upper aerodynamic profile 5. Moreover, the lower aerodynamic profile 6 is mounted within the fin-shaped supports 7 to rotate around a horizontal rotational axis 12 which extends alongside or is parallel to the rotational axis 11, is transversally arranged with respect to the forward direction of the road vehicle 1, and is arranged close to the leading edge (arranged at the front) of the lower aerodynamic profile 6; that is, the rotational axis 12 is arranged at the leading edge of the lower aerodynamic profile 6. According to the above scheme, the two aerodynamic profiles 5 and 6 are hinged to the fin-shaped supports 7 in an opposite fashion: the upper aerodynamic profile 5 is hinged "at the tail" for rotating close to the trailing edge thereof (at the back with respect to the motion direction), while the lower aerodynamic profile 6 is hinged "at the head" for rotating close to the leading edge thereof.

Figure 8:
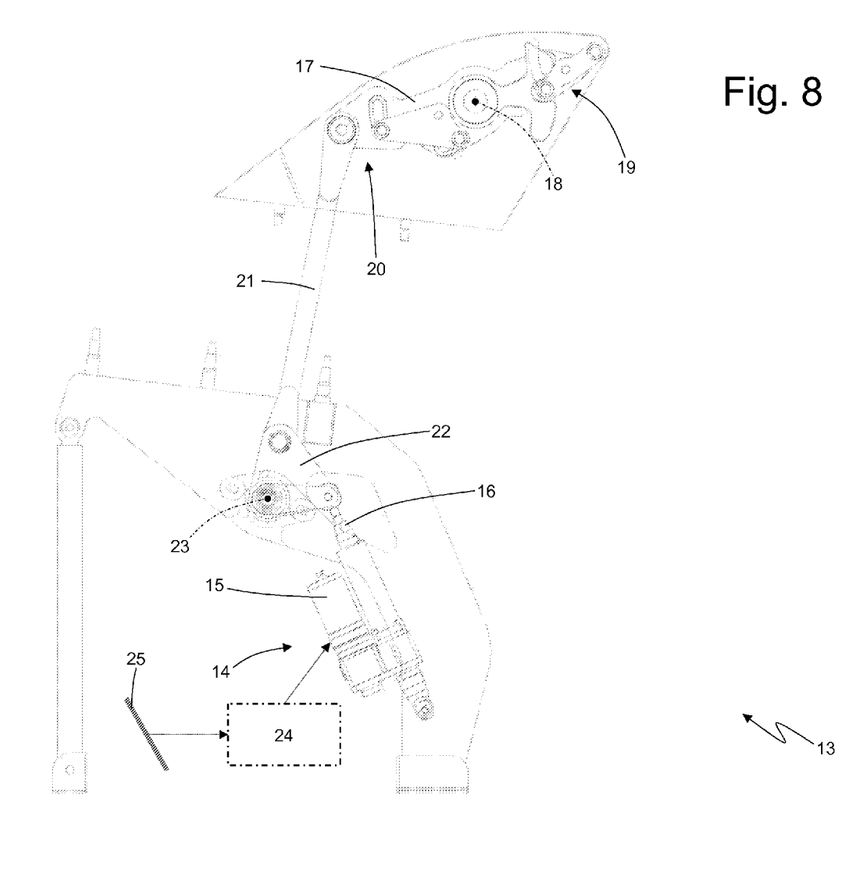
FIG. 8 shows a diagrammatic view, with parts removed for clarity, of an actuation system of the rear spoiler in FIG. 1.
Figure 9:
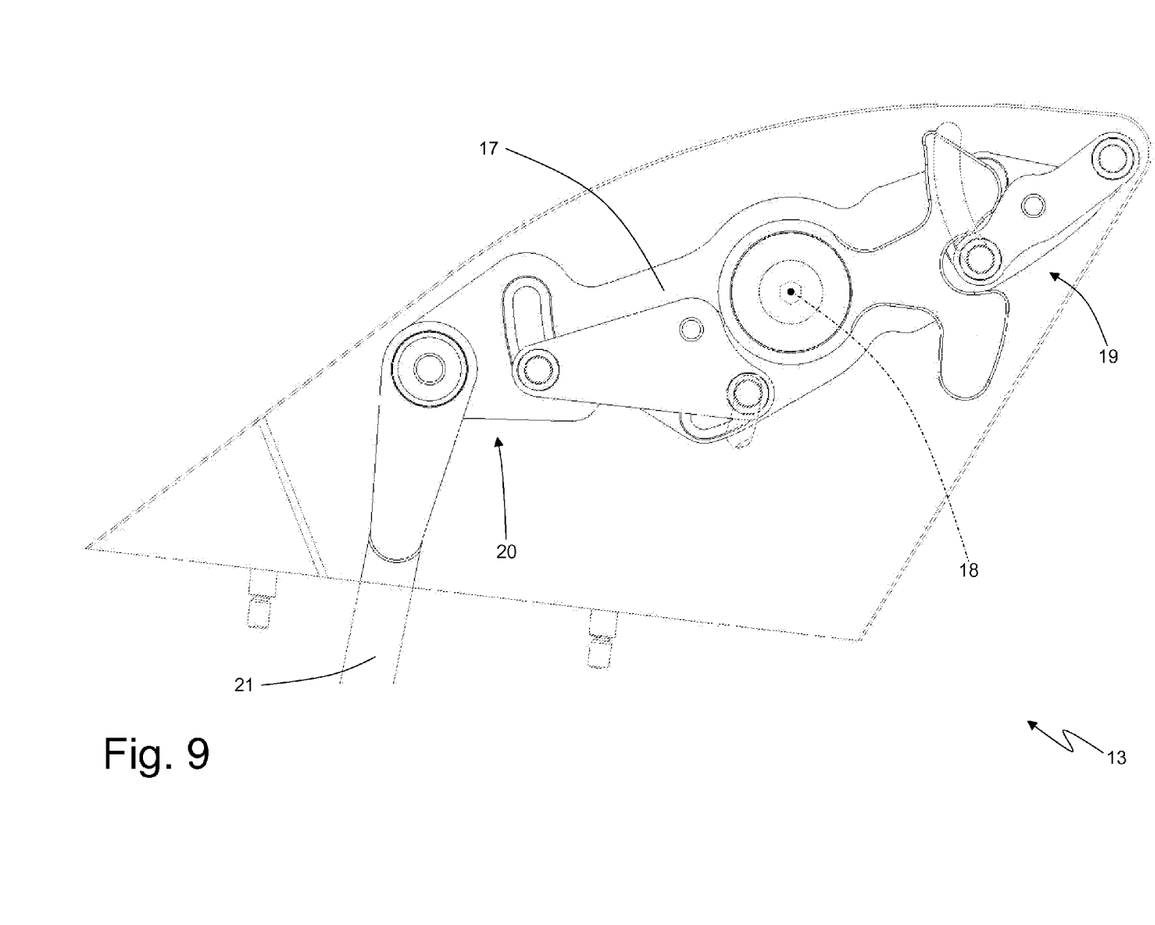
FIG. 9 shows a view on enlarged scale of a detail of FIG. 8.

As shown in FIGS. 8 and 9, a mechanical transmission 13 is provided, which connects the two aerodynamic profiles 5 and 6 to each other for generating rotations with opposite directions of the two aerodynamic profiles 5 and 6 themselves (i.e. when the upper aerodynamic profile 5 rotates in clockwise direction around its rotational axis 11, the lower aerodynamic profile 6 then rotates in counterclockwise direction around its rotational axis 12, and vice versa). Moreover, the rotations of the two aerodynamic profiles 5 and 6 around the corresponding rotational axes 11 and 12, and generated by the mechanical transmission 13, occur according to a kinematic law which provides for a fixed ratio between the corresponding angular strokes. In other words, the mechanical transmission 13 makes the two aerodynamic profiles 5 and 6 angularly integral with each other so that a rotation of one of the two aerodynamic profiles 5 or 6 always corresponds to an equivalent rotation of the other aerodynamic profile 6 or 5 according to a fixed ratio. The transmission ratio between the two aerodynamic profiles 5 and 6 can be such that the angle of rotation of the upper aerodynamic profile 5 around the rotational axis 11 is greater than the corresponding angle of rotation of the lower aerodynamic profile 6 around the rotational axis 12. In the embodiment shown in the accompanying drawings, the ratio of the angle of rotation of the upper aerodynamic profile 5 around the rotational axis 11 to the corresponding angle of rotation of the lower aerodynamic profile 6 around the rotational axis 12 is 4; in other words, when the lower aerodynamic profile 6 makes a 1° rotation around the rotational axis 12, the upper aerodynamic profile 5 makes a 4° rotation around the rotational axis 11, and vice versa. It is apparent that such a transmission ratio may be changed according to the aerodynamic features to be obtained and/or according to the particular pattern of the aerodynamic contours of the subject aerodynamic profiles 5 and 6.

In the embodiment shown in the accompanying drawings, a single actuator 14 is mechanically connected to the mechanical transmission 13 and causes both aerodynamic profiles 5 and 6 to rotate simultaneously around their corresponding rotational axes 11 and 12. In the embodiment shown in the accompanying drawings, actuator 14 consists of a rotating electric motor 15 which transmits the motion to a piston 16 which axially slides forward or backward according to the direction of rotation of the electric motor 15.

Mechanical transmission 13 and actuator 14 are located completely within the corresponding fin-shaped support 7.

The mechanical transmission 13 comprises a rocker arm 17 which is hinged to the structure of the fin-shaped support 7 to rotate around a horizontal rotational axis 18 that is parallel to the two rotational axes 11 and 12 of the aerodynamic profiles 5 and 6, and is arranged between the two rotational axes 11 and 12 of the aerodynamic profiles 5 and 6. Rocker arm 17 has an extremity 19 that is mechanically connected to the upper aerodynamic profile 5 in order to transmit motion to the upper aerodynamic profile 5 itself, and an extremity 20 that is opposite to extremity 19 with respect to the rotational axis 18 and is mechanically connected to the lower aerodynamic profile 6 in order to transmit motion to the lower aerodynamic profile 6 itself.

The mechanical transmission 13 comprises a rod 21 that secures the extremity 20 of rocker arm 17 to the actuator 14. The mechanical transmission 13 can comprise a rocker arm 22 which is hinged to a structure of the fin-shaped support 7 of the road vehicle 1 to rotate around a horizontal rotational axis 23 that is parallel to the two rotational axes 11 and 12 of the aerodynamic profiles 5 and 6; rocker arm 22 has a first extremity hinged to rod 21 and a second extremity 20 hinged to the sliding piston 16 of actuator 14.

According to two alternative embodiments, a single mechanical transmission 13 may be provided, which is arranged within only one of the two fin-shaped supports 7, or two mechanical transmissions 13 may be provided which are identical and arranged mirror-wise within the respective fin-shaped supports 7. When two mechanical transmissions 13 are provided, an embodiment provides for both mechanical transmissions 13 to be provided with their own actuator 14 and to be connected to each other only by means of the aerodynamic profiles 5 and 6 (i.e. no other mechanical connection is provided between the mechanical transmissions 13 besides the aerodynamic profiles 5 and 6). As an alternative, a single (active) mechanical transmission 13 of actuator 14 may be provided, while the other (passive) mechanical transmission has no actuator 14; in this case, an external mechanical connection (independent of the aerodynamic profiles 5 and 6) may be provided, which mechanically secures the two mechanical transmissions 13 and which engages the active mechanical transmission 13 at the actuator 14.

Actuator 14 or actuators 14 (if they are both provided) may be controlled by a control unit 24 (diagrammatically shown in FIG. 8) in order to move the two aerodynamic profiles 5 and 6 between a minimum incidence limit or "completely open" position (shown in FIGS. 3 and 7), in which the aerodynamic profiles 5 and 6 provide the minimum downforce (and thus also a minimum running resistance), and a maximum incidence limit or "completely closed" position (shown in FIGS. 2 and 6), in which the aerodynamic profiles 5 and 6 provide the maximum downforce (and thus also a maximum running resistance).

The above-described rear spoiler 4 has several advantages.

Firstly, the above-described rear spoiler 4 has a very high aerodynamic efficiency, i.e. it has a very high ratio of the downforce obtainable with the aerodynamic profiles 5 and 6 in a maximum incidence configuration to the running resistance obtainable with the aerodynamic profiles 5 and 6 in a minimum incidence configuration.

Moreover, the actuation system of the above-described rear spoiler 4 is particularly fast, simple, light and compact. This result is achieved due to the fact that a single actuator 14 allows the concurrent movement (rotation) of both aerodynamic profiles 5 and 6 to be controlled. Furthermore, this result is achieved due to the fact that the two aerodynamic profiles 5 and 6 are hinged in an opposite fashion (i.e. the upper aerodynamic profile 5 is hinged at the back with respect to the motion direction, while the lower aerodynamic profile 6 is hinged at the front with respect to the motion direction), and therefore the twisting torques received by the hinged axes and generated by the aerodynamic action on the aerodynamic profiles 5 and 6 always have opposite signs and thus tend to reciprocally neutralize; in other words, the twisting torque generated by the aerodynamic action on the upper aerodynamic profile 5 has one direction while the twisting torque generated by the aerodynamic action on the lower aerodynamic profile 6 has an opposite direction and thus, since the two aerodynamic profiles 5 and 6 are mechanically connected together to be actuated by a single actuator 14, actuator 14 will need to overcome in any situation not the sum of the two twisting torques generated by the aerodynamic action on the aerodynamic profiles 5 and 6, but the difference between the two twisting torques generated by the aerodynamic action on the aerodynamic profiles 5 and 6. Therefore, on the one hand the structure of the mechanical transmission 13 and of the actuator 14 may be "lighter", the performance being equal (i.e. the actuation speed being equal) as it needs to withstand not the sum of the two twisting torques generated by the aerodynamic action on the aerodynamic profiles 5 and 6, by the difference between the two twisting torques generated by the aerodynamic action on the aerodynamic profiles 5 and 6. On the other hand, actuator 14 can move (rotate) the aerodynamic profiles 5 and 6 in a very fast (quick) manner, thus ensuring very short response times to the action of the control unit 24, as the driving torque generated by actuator 14 only needs to overcome the difference between the two twisting torques generated by the aerodynamic action on the aerodynamic profiles 5 and 6.

By virtue of its compactness, the actuation system of the rear spoiler 4 is completely "streamlined", as it remains completely within the fin-shaped supports 7, and therefore it causes no additional aerodynamic resistance.

The invention claimed is:

1. A rear spoiler with adjustable aerodynamic profiles for a high performance road vehicle; the rear spoiler comprising:
    at least one fin-shaped support;
    a first adjustable aerodynamic profile that is mounted onto the fin-shaped support and that rotates, with respect to the fin-shaped support, around a first rotational axis; and
    a second adjustable aerodynamic profile that is mounted onto the fin-shaped support at a different height than the first aerodynamic profile and that rotates, with respect to the fin-shaped support, around a second rotational axis that is parallel to the first rotational axis;
    wherein the first rotational axis is located close to a trailing edge of the first aerodynamic profile and the second rotational axis is located close to a leading edge of the second aerodynamic profile.

2. A rear spoiler as claimed in claim 1, wherein the first aerodynamic profile is located above the second aerodynamic profile and at a certain distance from it.

3. A rear spoiler as claimed in claim 1, wherein:
    the second aerodynamic profile is a main aerodynamic profile and is assisted in its function by the first aerodynamic profile that is an ancillary aerodynamic profile;
    the first aerodynamic profile is smaller than the second aerodynamic profile; and
    the leading edge of the first aerodynamic profile is located close to the trailing edge of the second aerodynamic profile, which second aerodynamic profile the first aerodynamic profile is meant to assist.

4. A rear spoiler as claimed in claim 1, wherein the two aerodynamic profiles always rotate around their respective rotational axes in opposite directions.

5. A rear spoiler as claimed in claim 1 and comprising:
    a mechanical transmission that connects the two aerodynamic profiles at a fixed transmission ratio, so that the ratio between the angle of rotation of the first aerodynamic profile around the first rotational axis and the corresponding angle of rotation of the second aerodynamic profile around the second rotational axis stays always the same; and
    at least one actuator that is mechanically connected to the mechanical transmission and causes both aerodynamic profiles to rotate simultaneously around their respective rotational axes.

6. A rear spoiler as claimed in claim 5, wherein the transmission ratio between the two aerodynamic profiles is such that the angle of rotation of the first aerodynamic profile around the first rotational axis is greater than the corresponding angle of rotation of the second aerodynamic profile around the second rotational axis.

7. A rear spoiler as claimed in claim 5, wherein the mechanical transmission comprises at least a first rocker arm that is hinged so that it rotates around a third rotational axis that is parallel to the two rotational axes of the two aerodynamic profiles.

8. A rear spoiler as claimed in claim 7, wherein:
the third rotational axis of the first rocker arm is located in between the two rotational axes of the aerodynamic profiles; and
the first rocker arm has a first extremity that is mechanically connected to the first aerodynamic profile in order to transmit movement to the first aerodynamic profile, and a second extremity that is located at the opposite side of the third rotational axis than the first extremity and that is mechanically connected to the second aerodynamic profile in order to transmit motion to the second aerodynamic profile.

9. A rear spoiler as claimed in claim 7, wherein the mechanical transmission comprises a rod that links one extremity of the first rocker arm to the actuator.

10. A rear spoiler as claimed in claim 9, wherein the mechanical transmission comprises a second rocker arm that has a first extremity connected with a hinge to the rod and a second extremity connected with a hinge to a sliding plunger of the actuator, which second rocker arm is hinged so that it rotates around a fourth rotational axis that is parallel to the two rotational axes of the aerodynamic profiles.

11. A rear spoiler as claimed in claim 5, wherein the mechanical transmission and the actuator are located completely within the fin-shaped support.

12. A rear spoiler as claimed in claim 1 and comprising:
two fin-shaped supports located at opposite sides of the aerodynamic profiles; and
two lateral projecting elements, each one fixed to its respective fin-shaped support on the side opposite the aerodynamic profiles.

13. A rear spoiler as claimed in claim 12, wherein each lateral projecting element is shaped as an "L" when viewed from the front, and it is made of a substantially horizontal innermost part that is fixed to an external surface of the corresponding fin-shaped support, and of an outermost part that is set at an angle with respect to the innermost part, so that the outermost part bends towards the vertical.

14. A rear spoiler as claimed in claim 13, wherein the outermost part of each lateral projecting element creates an angle between 45° and 90° with its innermost part.

15. The rear spoiler as claimed in claim 1, wherein the high performance vehicle is a road vehicle.

16. A system for varying the aerodynamics of a high performance vehicle, comprising:
a rear spoiler including a plurality of adjustable airfoils, the rear spoiler comprising:
at least one fin-shaped support;
a first airfoil that is mounted onto the fin-shaped support and that rotates, with respect to the fin-shaped support, around a first rotational axis; and
a second airfoil that is mounted onto the fin-shaped support at a different height than the first airfoil and that rotates, with respect to the fin-shaped support, around a second rotational axis that extends alongside the first rotational axis;
wherein the first rotational axis is located proximal a trailing edge of the first airfoil and the second rotational axis is located proximal a leading edge of the second airfoil.

17. A system as claimed in claim 16, wherein the first airfoil is located above the second airfoil and at least partially behind it.

18. A system as claimed in claim 16, wherein:
the second airfoil is a main airfoil and is assisted in its function by the first airfoil that is an ancillary airfoil;
the first airfoil is smaller than the second airfoil; and
the leading edge of the first airfoil is located proximal the trailing edge of the second airfoil, which second airfoil the first airfoil is meant to assist.

19. A system as claimed in claim 16, wherein the two airfoils are configured to rotate around their respective rotational axes in opposite directions.

20. A system as claimed in claim 16 and comprising:
a mechanical transmission that connects the two airfoils at a fixed transmission ratio, so that the ratio between the angle of rotation of the first airfoil around the first rotational axis and the corresponding angle of rotation of the second airfoil around the second rotational axis stays the same; and
at least one actuator that is mechanically connected to the mechanical transmission and causes both airfoils to rotate simultaneously around their respective rotational axes.

21. A rear spoiler with adjustable aerodynamic profiles for a high performance road vehicle; the rear spoiler comprising:
at least one fin-shaped support;
a first adjustable aerodynamic profile that is mounted onto the fin-shaped support and that rotates around a first rotational axis;
a second adjustable aerodynamic profile that is mounted onto the fin-shaped support at a different height than the first aerodynamic profile and that rotates around a second rotational axis that is parallel to the first rotational axis;
a mechanical transmission that connects the two aerodynamic profiles at a fixed transmission ratio, so that the ratio between the angle of rotation of the first aerodynamic profile around the first rotational axis and the corresponding angle of rotation of the second aerodynamic profile around the second rotational axis stays always the same; and
at least one actuator that is mechanically connected to the mechanical transmission and causes both aerodynamic profiles to rotate simultaneously around their respective rotational axes;
wherein the mechanical transmission comprises at least a first rocker arm that is hinged so that it rotates around a third rotational axis that is parallel to the two rotational axes of the two aerodynamic profiles.

22. A rear spoiler as claimed in claim 21, wherein:
the third rotational axis of the first rocker arm is located in between the two rotational axes of the aerodynamic profiles; and
the first rocker arm has a first extremity that is mechanically connected to the first aerodynamic profile in order to transmit movement to the first aerodynamic profile, and a second extremity that is located at the opposite side of the third rotational axis than the first extremity and that is mechanically connected to the second aerodynamic profile in order to transmit motion to the second aerodynamic profile.

23. A rear spoiler as claimed in claim 21, wherein the mechanical transmission comprises a rod that links one extremity of the first rocker arm to the actuator.

24. A rear spoiler with adjustable aerodynamic profiles for a high performance road vehicle; the rear spoiler comprising:
- at least one fin-shaped support;
- a first adjustable aerodynamic profile that is mounted onto the fin-shaped support and that rotates around a first rotational axis;
- a second adjustable aerodynamic profile that is mounted onto the fin-shaped support at a different height than the first aerodynamic profile and that rotates around a second rotational axis that is parallel to the first rotational axis;
- two fin-shaped supports located at opposite sides of the aerodynamic profiles; and
- two lateral projecting elements, each one fixed to its respective fin-shaped support on the side opposite the aerodynamic profiles.

25. A rear spoiler as claimed in claim 24, wherein each lateral projecting element is shaped as an "L" when viewed from the front, and it is made of a substantially horizontal innermost part that is fixed to an external surface of the corresponding fin-shaped support, and of an outermost part that is set at an angle with respect to the innermost part, so that the outermost part bends towards the vertical.

26. A rear spoiler as claimed in claim 25, wherein the outermost part of each lateral projecting element creates an angle between 45° and 90° with its innermost part.

* * * * *